United States Patent [19]

Viel

[11] Patent Number: 5,643,367
[45] Date of Patent: Jul. 1, 1997

[54] METHOD AND DEVICE FOR CLEANING SOLID ELEMENTS

[75] Inventor: Charles-Henri Viel, Champforgeuil, France

[73] Assignee: Saint Gobain Emballage, Courbevoie, France

[21] Appl. No.: 464,622

[22] PCT Filed: Oct. 25, 1994

[86] PCT No.: PCT/FR94/01244

§ 371 Date: Nov. 15, 1995

§ 102(e) Date: Nov. 15, 1995

[87] PCT Pub. No.: WO95/11764

PCT Pub. Date: May 4, 1995

[30] Foreign Application Priority Data

Oct. 26, 1993 [FR] France .................................. 93 12750

[51] Int. Cl.⁶ ............................................... B08B 7/00
[52] U.S. Cl. ................................ 134/1; 134/2; 134/23; 134/40
[58] Field of Search .................................... 134/2, 32, 40, 134/23, 1

[56] References Cited

U.S. PATENT DOCUMENTS 4,483,718  11/1984  Bross et al. .......................... 134/25.4
5,151,134  9/1992   Boquillon et al. ...................... 134/1

FOREIGN PATENT DOCUMENTS 1480714  10/1975  United Kingdom ............. B08B 7/02
2169496  7/1986   United Kingdom ............. B08B 7/00

*Primary Examiner*—Jill Warden
*Assistant Examiner*—Alexander Markoff
*Attorney, Agent, or Firm*—Oblon, Spivak, McClelland, Maier & Neustadt, P.C.

[57] ABSTRACT

A method and device for cleaning solid elements such as glass making moulds. The moulds are cleaned by first removing greases or organic materials and then cleaning by photo-ablation by a laser impact of at least a portion of the surface of the moulds. The two steps may be repeated.

5 Claims, 2 Drawing Sheets

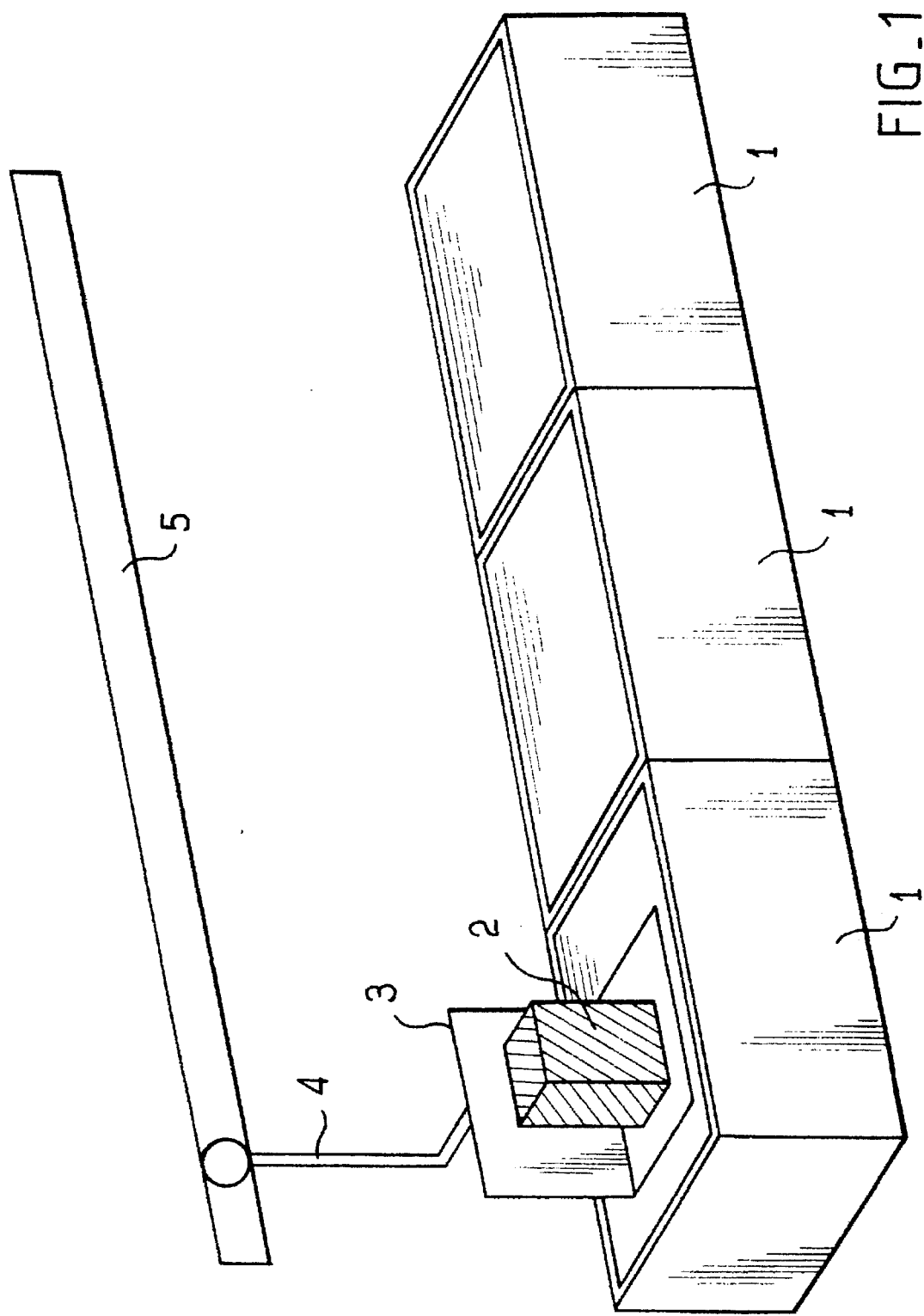
FIG_1

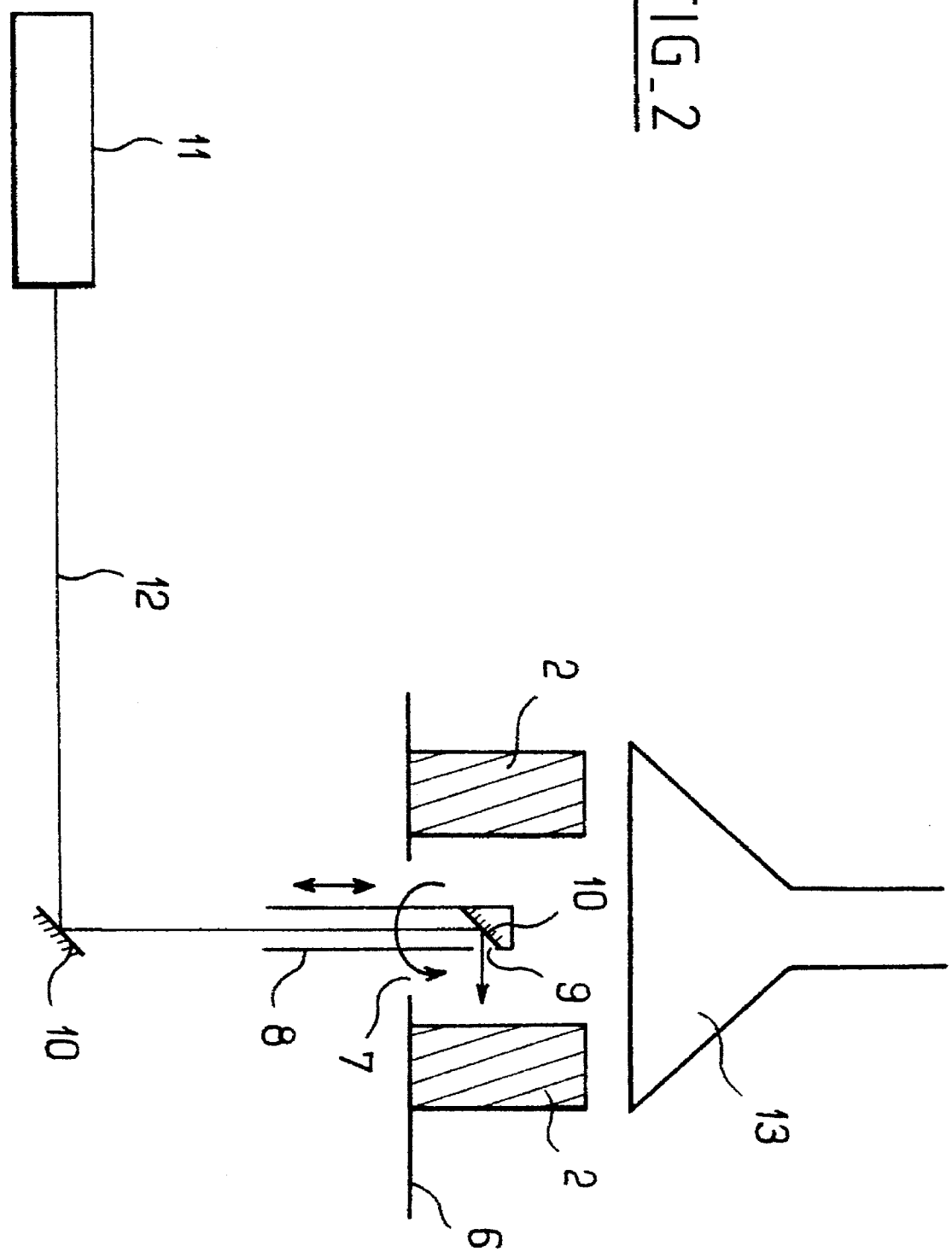

METHOD AND DEVICE FOR CLEANING SOLID ELEMENTS

BACKGROUND OF THE INVENTION

1. Field of the Invention

This invention relates to a method of cleaning solid elements, such as moulds, and more especially the cleaning of glassmaking moulds.

2. Discussion of the Background

Although the invention concerns other industries, its explanation will be limited to the cleaning of glassmaking moulds. Glassmaking moulds, notably those used for the production of bottles or flasks, are of several types; they may be, for example, roughing moulds and finishing moulds. These moulds operate most commonly at very high production rates, that is to say they produce a large number of bottles or flasks very rapidly. During manufacture these moulds and, more particularly, the zones that come into contact with the glass, are treated with agents such as greases. Consequently, this type of mould becomes dirty very rapidly and therefore must be regularly cleaned to give finished products of good quality.

In glassworks operating at the usual high rates, the roughing moulds are cleaned approximately every two days and the finishing moulds approximately once a week.

The techniques commonly used for cleaning glassmaking moulds are of the mechanical type. Sandblasting or indeed polishing techniques, for example, may be used. It appears that these techniques are entirely satisfactory from the cleaning aspect, and enable the entire layer of dirt which becomes deposited during use to be removed.

In contrast, it has become apparent that these treatments are generally too severe. In fact, simultaneously with the removal of the dirt, this type of treatment damages the metal of which the mould is made. Such damage of the mould, which corresponds at each cleaning to an erosion of approximately 10 microns from the surface of the mould, has harmful consequences.

In fact, the size of the cavity or indentation, that is the place where the product is formed, is increased, which leads either to a greater consumption of glass for an equivalent product or a variation in the capacity of the article for a constant consumption of glass. The external dimensions of the articles are also modified and no longer meet the requirements. Furthermore, these deformations lead to problems of demoulding which generally result in defects or breakage of the finished products. Most commonly, the finished products have a surface state which degrades with the aging of the mould. These disadvantages lead to maintenance costs for repairing the moulds which are generally high and to premature replacement of these moulds.

The French Patent published under number 2 641 718 describes a cleaning method which enables different types of dirt on surfaces, for example metal surfaces, to be removed without wear or degradation of the metal. This is a technique of photo-ablation by laser impact. Tests have shown that the application of this method to the cleaning of glassmaking moulds enables the film of dirt to be effectively removed without degradation of the surface of the mould. On the other hand, the application of this method to the cleaning of moulds does possess disadvantages which make it unacceptable from an industrial aspect. In fact, the time necessary for performing the cleaning of a mould by this method is too long and cannot be reconciled with the production rates necessary for cleaning glassmaking moulds.

The moulds have, in addition, geometries that are frequently complicated, which make them difficult to clean by a laser beam which cannot reach all the corners and, notably, the grooves and fins present on the outer surface of the mould. The regions of the moulds that enable the different parts of which the moulds are made to be fitted and hooked together are also very difficult of access by a laser beam. The cleaning of these regions by such a technique would necessitate difficult handling operations which by their nature are relatively slow.

SUMMARY OF THE INVENTION

The invention has as its objective a method of cleaning moulds which shall not result in any degradation of the surface, which shall enable complete cleaning of the surface and which shall be compatible with the cleaning rates of moulds in industry.

During their investigations, the inventors have been able to demonstrate an essential characteristic of the types of dirt, or at least of their nature.

It has indeed become apparent that the dirt present on glassmaking moulds, after use, is of two types. The mould is on the one hand covered over its entire surface (a first surface region) with a relatively thick and soft film, composed more especially of greasy or organic materials, and on the other hand it is covered with a fine film of mineral material, resulting certainly from the corrosion of the metal of the mould. This fine film is situated directly in contact with the surface of the mould (a second surface region) and therefore beneath the first film described. Furthermore, this fine film appears only on the surface of the mould in contact with the hot glass, that is to say at the level of the indentation or cavity of the mould.

The objectives set out above are achieved, according to this invention, by a method of cleaning solid elements, such as glassmaking moulds, in at least one step for removing the greases or organic materials, followed by at least one step of cleaning by photo-ablation by laser impact of at least a part of the surface of the elements.

According to one advantageous variant, the step of cleaning by photo-ablation by laser impact concerns the surfaces in contact with the hot glass.

The first step may be carried out at relatively high rates and enables all the dirt of the first type to be removed, that is to say the greases or organic materials. The second step of cleaning by laser impact, which is limited to a portion only of the surface and, more especially, to the contact zones with the hot glass (the second surface region), that is to say with the indentation or cavity of the mould, enables the fine film resulting from the corrosion of the metal in this region to be removed. This surface being limited and, furthermore, very easy of access, this cleaning can be adapted to the industrial production rates in glassmaking.

Preferably, the removal of the greases or organic materials is carried out by a technique combining the action of washing baths, notably basic baths, and the action of ultrasounds. The washing baths are, more particularly, baths containing soda lye and surface-active agents.

Preferably also, the laser impact is produced by a laser beam delivering a peak power density lying between a few megawatts per $cm^2$ and several tens of megawatts per $cm^2$, by impulse with a duration lying between a few nanoseconds and several tens of nanoseconds and having a firing frequency adjustable from 0 to 30 Hz.

The process thus described enables the anticipated results to be achieved, that is to say a total cleaning of the surface of the moulds without any degradation of said surface in a sufficiently rapid time to be adapted to the required performance rates, notably for the cleaning of glassmaking moulds.

The invention proposes also a device for carrying out this process. This device for the cleaning of solid elements, such as glassmaking moulds, comprises on the one hand means assuring the removal of the greases or organic materials from the moulds and, on the other hand, a laser associated with means orientating the beam onto at least the surface of the moulds in contact with the hot glass.

Preferably, the means assuring the removal of the greases or organic materials are a series of tanks, combining effects of baths containing a base, such as soda lye, and of surface-active agents, and also ultrasounds.

Preferably also, the laser is a neodymium-doped YAG laser, with a wavelength of 1.06 microns supplying an energy of approximately 500 millijoules per pulse, of a duration which may range from a few nanoseconds to a few tens of nanoseconds and preferably between 10 and 30 nanoseconds, and possessing an adjustable firing frequency of 0 to 30 Hz. Preferably again, the pulse duration is 22 nanoseconds.

According to one advantageous form of embodiment, the supplementary cleaning of the surface of the moulds in contact with the hot glass is carried out by means of a device enabling the laser beam to scan fixed moulds.

The device is advantageously associated with a robot and conveying elements, such as baskets, enabling the moulds to be displaced through the various tanks and then to be brought into a fixed position to undergo the cleaning by laser impact.

BRIEF DESCRIPTION OF THE DRAWINGS

Other details and advantageous characteristics of the invention will become apparent below from the examples of embodiment with reference to FIG. 1, 2, which show:

FIG. 1: an example of a device for degreasing the moulds,

FIG. 2: a schematic representation of a device enabling the sweeping of the laser beam over a portion of the moulds.

DISCUSSION OF THE PREFERRED EMBODIMENT

The moulds used in the glassmaking industry for the manufacture of receptacles of glass, such as bottles or flasks, are of various types. They may be, for example, roughing moulds and finishing moulds. These moulds are subjected to very rapid production cycles. They may produce one bottle every five seconds approximately. For maintaining such production rates, these moulds are repeatedly cooled, greased, coated with demoulding agents et.. All these steps contribute to fouling of the moulds, on which appear residues, greasy or organic deposits and every type of dirt and fouling, and these must be removed very regularly by suitable cleaning.

In FIG. 1 there are shown schematically an assembly comprising several tanks 1, through which the moulds 2 will pass successively in order to undergo a total degreasing. The moulds 2 may have various shapes, and have been shown here very simply. The moulds 2 are subjected, as they pass through these various tanks 1, to combined actions of washing bath effects and ultrasound effects. The baths comprise, for example, soda lye associated with surface-active The washing bath liquid has, for example, a pH in the region of 14. The presence of several tanks 1 is necessary to make possible, if necessary, the passage through a washing bath, then through a rinsing bath, and then through a passivation or "dewatering" bath, that is to say one that prevents later corrosion. This type of installation is, for example, of the type sold commercially by the company FISA, which offers in its range of VST models installations suitable for the degreasing of such moulds.

After passage through this installation, the deposits of greasy material or organic material which generally cover the entire surface of the moulds are removed. The moulds 2 frequently comprise locations, not visible in the figures, that are very difficult of access for cleaning. These zones of difficult access are more especially the grooves and fins present on the outer surface of the moulds or the regions enabling the different parts of the mould to be fitted or engaged into or onto one another. This type of cleaning, in which the moulds 2 are placed in the baths, enables the deposits of grease or organic material included in these zones to be removed.

In addition, this type of cleaning does not lead to any degradation or erosion of the materials of which the moulds are made.

The rates of cleaning by this technique are entirely compatible with the production cycles demanded in the glassmaking industry. Furthermore, it is possible to associate with these tanks 2 a robotized assembly of baskets 3 which will enable the transfer of the moulds 2 from one tank 1 to another to be carried out. These baskets 3 are supported by hooks 4, operated by handling robots, not illustrated here, suspended from a guide rail 5 mounted above the tanks 1. This device also makes possible the transfer of the moulds 2 to the second installation, to which we shall return below, in the course of the description relating to FIG. 2.

At the end of this first step, that is after the moulds 2 have passed through the tanks 1, a considerable part of the residues which covered them after use has been removed. In contrast, it appears that, in the regions in contact with the hot glass, that is the cavity or recess of the mould, there remains a fine film of residues resulting, basically, from corrosion of the metal of the mould.

These residues have a hardness greater than that of the constituent material of the moulds. It is therefore very difficult to remove them without damaging the surface of the moulds. Moreover, the fine film of residues is not homogenous and the treatment that is applied to it simultaneously attacks the metal surface of the mould. In fact, many techniques, notably mechanical techniques such as shot-blasting, sand-blasting or grit-blasting, which enable this fine film of residues to be removed, simultaneously result in wear of the surface of the mould. This wear, which is repeated at every cleaning, becomes the principal cause of wear and may contribute to an increase in the consumption of glass, an increase in the risks of defects during demoulding and a reduction in the possible working life of these moulds.

The second phase of cleaning, illustrated in FIG. 2, enables these drawbacks to be overcome. In this FIG. 2, the rail 5 is not shown, but all the same it enables the moulds 2 to be conveyed, by means of carriages 3 also not shown, to the working station of the second step of the cleaning.

The moulds 2 are set down on a working plane 6, which leaves a passage 7 free. Through this passage 7 there passes a hollow tube 8 equipped with an orifice 9 and associated with a set of mirrors 10. This tube 8 is comparable to a periscope.

This tube 8 can be given a vertical translatory movement in both directions and a rotary movement by a drive system, not illustrated in FIG. 2.

A source 11, indicated schematically here, emits a laser beam 12, which is transmitted through the tube 8 by the mirrors 10 and reemitted at the level of the orifice 9. The emission of this beam 12 through the orifice 9, associated with the movements of the tube 8, makes possible a complete sweeping of the surface of the cavity of the mould. The association of these two movements may, in fact, enable a helicoidal movement to be given to the orifice 9, the pitch of which is chosen so that the laser beam covers the entire area of the recess of the mould 2.

The laser used is of the neodymium-doped YAG type, as described in French Patent of Invention 2 641 718.

This second cleaning phase, described in FIG. 2, enables the fine film of residues which resists the first cleaning phase during passage through the tanks 1 to be removed. Moreover, the surface of the mould remains intact after this cleaning and does not exhibit wear. In effect, in contrast to other techniques which consist of destroying these residues, the cleaning technique by laser consists of attacking the residue-metal interface. Now it appears that this interface has a resistance less than that of the fine film of residues and that of the metal constituting the mould 2. It is therefore possible to break this interface without altering the metal.

For this purpose, the laser beam creates a rapid heating at constant volume, which creates a pressure wave which leads to the rupture of this interface.

For preventing the fine film of residues thus detached from fouling the devices placed beneath the work plane 6, a suction system 13 removes these residues.

The device thus described with reference to FIGS. 1 and 2 makes possible entire cleaning of the surface of the moulds without degradation of this surface. Moreover, such a device is entirely compatible with the production rates required by the glassmaking industry for the cleaning of moulds. In fact, the second phase, that is the laser sweep, since it is limited to the cleaning of the recess or cavity of the mould, that is where the film resulting from the corrosion of the metal of the mould forms, the treatment time is much smaller than if it were necessary to treat the entire surface of the mould. Moreover, the indentation or cavity is very easy of access for the laser beam and therefore does not require special equipment or complicated handling.

The cleaning according to this invention has, in addition, the advantage of being able to increase the useful working life of a single mould on a shaping machine. In effect, since the wear during cleaning is virtually non-existent, the moulds can be cleaned a larger number of times before being discarded and can thus be used for a longer period, with good quality, notably a good surface condition, of the finished products.

I claim:

1. A method of cleaning glass making molds having a first surface region coated with an essentially organic material, and a second surface region which comes in contact with hot glass during glass making and is coated with the essentially organic material and an essentially non-organic material, said method comprising:

a first cleaning step of removing the essentially organic material on the first and second regions; and a second cleaning step, distinct from said first cleaning step, comprising a step of photo-ablation using laser impact substantially only on the essentially non-organic material on the second region.

2. The method claim 1 wherein said first cleaning step comprises bathing the glass making molds in at least one bath of combined action of caustic solution and ultrasound.

3. The method of claim 1 wherein said second cleaning step of photo-ablation uses laser pulses having a duration of between 10 nanoseconds and 30 nanoseconds and a firing frequency adjustable from zero to 30 Hz.

4. A method of cleaning glass making molds substantially entirely coated with a material which is removable by at least one bath of combined action of caustic solution and ultrasound, having a surface region which comes in contact with hot glass during glassmaking and is coated with the material which is removable by at least one bath of combined action of caustic solution and ultrasound, and essentially non-organic material which is not removable by at least one bath of combined action of caustic solution and ultrasound, said method comprising:

a first cleaning step of removing the material which is removable by at least one bath of combined action of caustic solution and ultrasound by immersing in at least one bath of combined action of caustic solution and ultrasound; and a second cleaning step, distinct from said first cleaning step, comprising a step of photo-ablation using laser impact substantially only on the essentially non-organic material on the surface region which comes in contact with the hot glass during glassmaking.

5. The method of claim 4 wherein said second cleaning of photo-ablation uses laser pulses having a duration of between 10 nanoseconds and 30 nanoseconds and a firing frequency adjustable from zero to 30 Hz.

* * * * *